G. K. WOODS.
TRAP.
APPLICATION FILED MAR. 9, 1912.
1,052,398.
Patented Feb. 4, 1913.
2 SHEETS—SHEET 1.
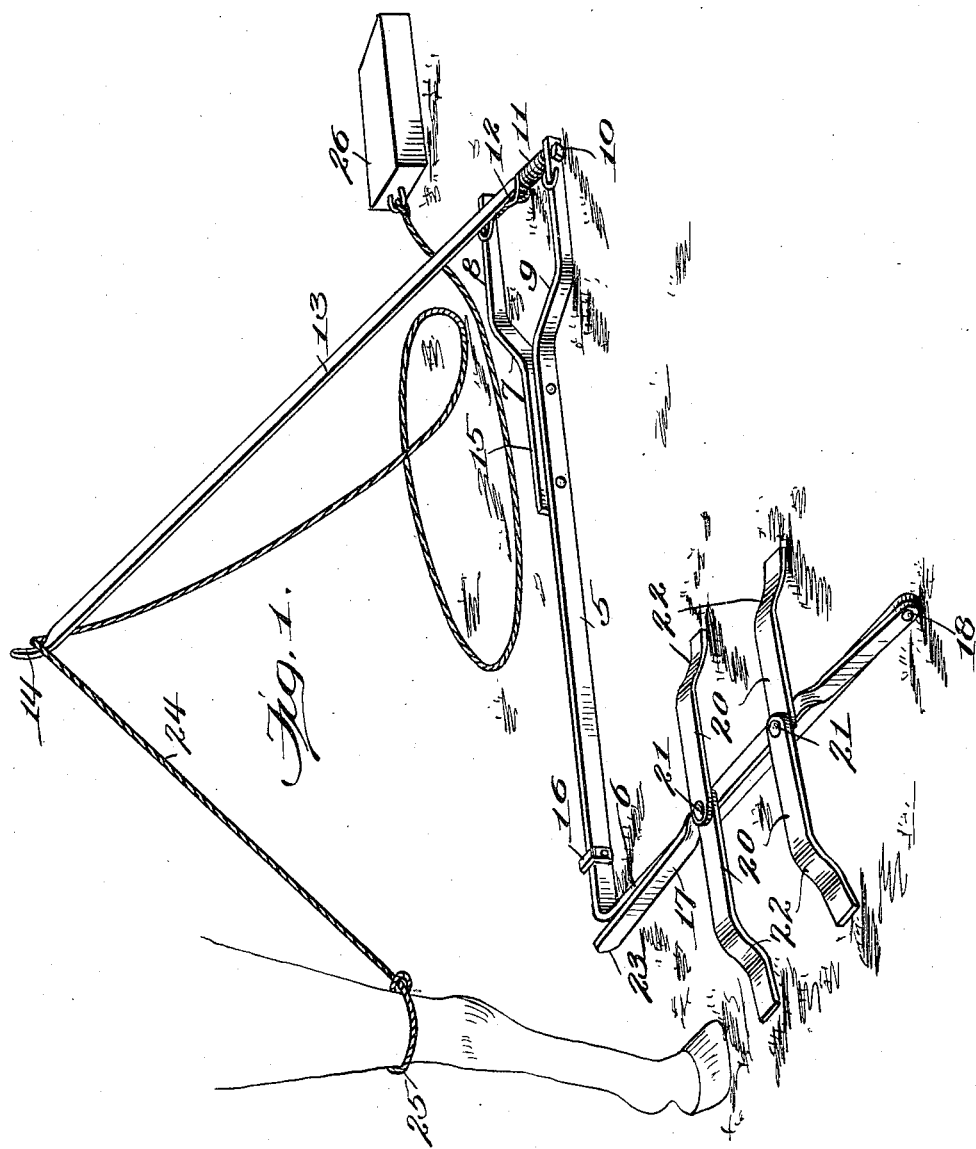
Witnesses:
Inventor
Green K. Woods G. K. WOODS.
TRAP.
APPLICATION FILED MAR. 9, 1912.
1,052,398.
Patented Feb. 4, 1913.
2 SHEETS—SHEET 2.
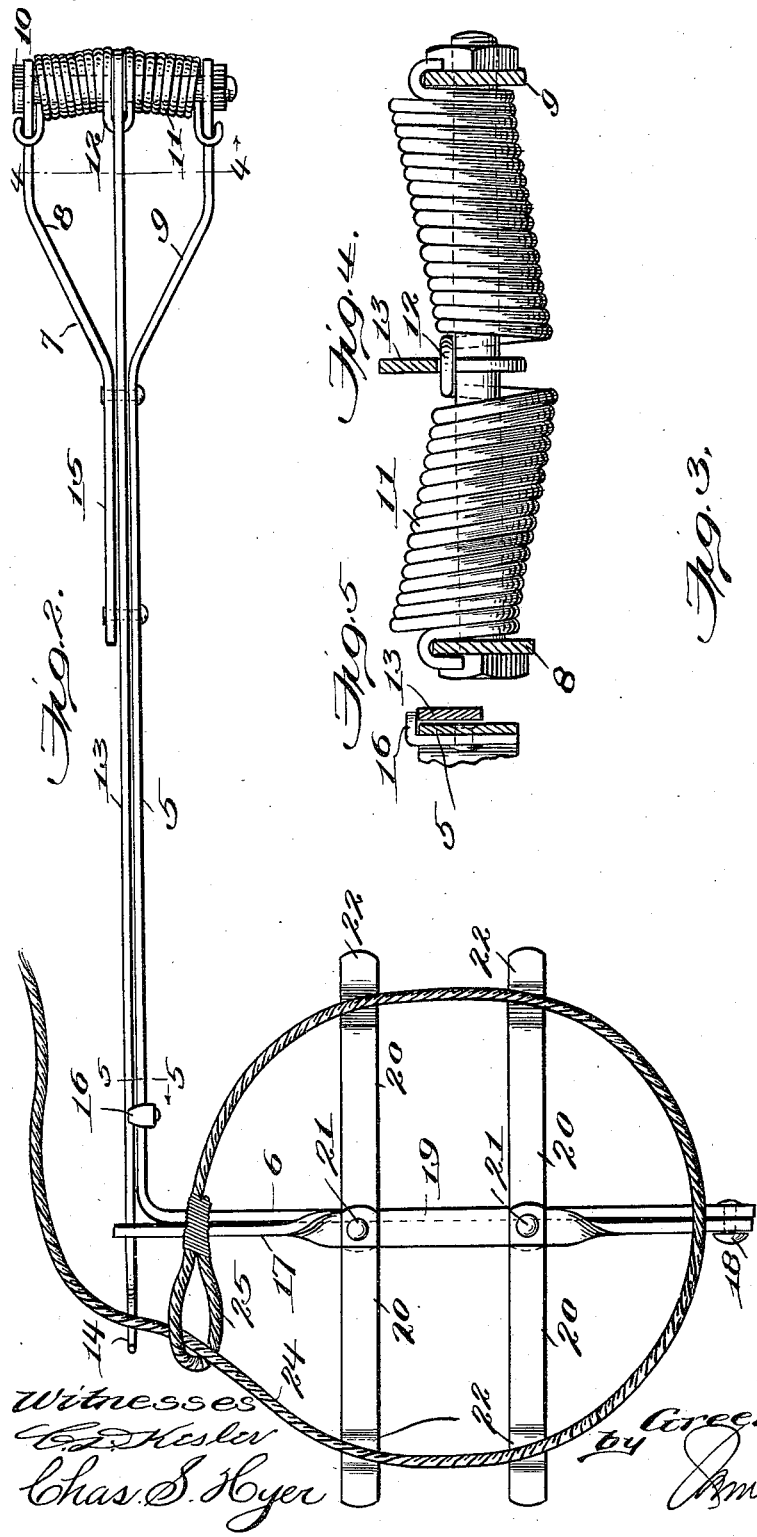
Witnesses
C. F. Kesler
Chas. S. Hyer
Inventor
Green K. Woods
by
James L. Norris
Atty.

UNITED STATES PATENT OFFICE.

GREEN K. WOODS, OF LOVELOCK, NEVADA.

TRAP.

1,052,398.

Specification of Letters Patent.   Patented Feb. 4, 1913.

Application filed March 9, 1912.   Serial No. 682,601.

*To all whom it may concern:*

Be it known that I, GREEN K. WOODS, a citizen of the United States, residing at Lovelock, in the county of Humboldt and State of Nevada, have invented new and useful Improvements in Traps, of which the following is a specification.

This invention relates to traps of that class having a coöperating slidable noose, and the primary object of the same is to provide a trap particularly adapted for catching wild animals of large size, such as horses, without injuring the latter, through the medium of a foot or leg lasso embodying the usual slidable noose and which is operated by the trap proper to throw the noose high up on the leg of the animal when the trap is sprung, and to impede the travel or movement of the animal through the medium of a weight connected to the lasso so that the animal may be easily caught.

A further object of the invention is to provide a positively acting trap having a simple construction arranged to support a portion of a foot or leg lasso and which is released by the animal treading on a portion of a trap to throw the lasso and its noose upwardly over the foot and leg which engages the releasing means of the trap so as to restrict the movements of the animal and facilitate his capture.

With these and other objects and advantages in view the invention consists in the construction and arrangement of the several parts which will be more fully hereinafter described and claimed.

In the drawings: Figure 1 is a perspective view of a trap shown in sprung position and as having applied the noose of a foot or leg lasso and embodying the features of the invention; Fig. 2 is a plan view of the trap shown set; Fig. 3 is a front elevation of the trap in set condition; Fig. 4 is a transverse vertical section on the line 4—4, Fig. 2; Fig. 5 is a transverse vertical section on the line 5—5, Fig. 2.

The trap embodies a main frame member consisting of a metal bar 5 of suitable dimensions having a right angular supporting arm 6 located at the front portion of the trap. The bar 5 and arm 6 are rigid and are arranged edgewise or so that the opposite edges will be in vertical alinement. Attached to the rear extremity of the bar 5 is an auxiliary supporting member 7 having an outwardly bent portion 8, the rear end of the bar 5 being likewise bent as at 9, and the two bent portions 8 and 9 forming a supporting yoke having a bolt 10 extending thereacross.

On the bolt 10 is mounted a close coiled or tension spring 11 having its opposite ends engaging the upper edges of the bent portions 8 and 9 and has a central impelling loop or arm 12. The rear end of a throwing arm 13 is fulcrumed on the central portion of the bolt 10, and engages the loop or arm 12, the latter bearing against the lower edge of said arms. The free extremity of the arm 13 is reduced and formed with a hook seat or extremity 14 for a purpose which will be more fully hereinafter explained. The shank 15 of the member 7 is held spaced from the adjacent portion of the bar 5, and the arm 13 is moved downwardly into said space when the trap is set. The arm 13 is longer than the bar 5 and projects forwardly beyond the supporting arm 6 any suitable distance as may be desired, and is movable under an outwardly projecting hook or catch 16 secured to the bar 5 adjacent to the point of intersection of the arm 6 with said bar. The fulcrumed end of the throwing arm 13 is loose so that the arm may have lateral play and the spring 11 has the coils thereof of such greater diameter than the bolt 10 as to permit a winding action of the spring thereon by swinging the arm 13 around the said post to thereby set the trap or to impart the arm 13 a quick throwing action when the trap is released or sprung. A trip member is operatively associated with the supporting arm 6 and consists of a flat bar 17 disposed edgewise and having one end pivotally attached to the free end of the said arm 6, as at 18, and formed with an intermediate quarter-turn or bend to provide a horizontally flat rest 19 on which are pivoted pairs of noose supports 20. The noose supports consist of flat bars projecting in opposite directions and each pair pivoted at the inner ends as at 21 to the flat rest 19, the outer or free ends of the bars being struck or bent downwardly as at 22 to form noose seats of such depth as to compensate for a rope or cable of suitable thickness so that the noose may be supported below the upper surfaces of the bars constituting the noose supporting means. The seats 22 are beveled downwardly to avoid the formation of any obstructing shoulders and to permit the noose to be freely thrown from the supporting means. The pairs of bars serving as the noose supporting means are spaced apart a suitable distance and are free to move on their fulcrums in order that they may be turned in close to the arm 6 and bar 17, or be extended outwardly as may be desired. The free extremity of the bar 17 is rounded or formed with a curved bevel 23 and projects far enough beyond the point of intersection of the bar 5 and arm 6 to rest on the upper edge of the throw arm 13 when the latter is set, as shown by Figs. 2 and 3. Furthermore, the bar 17 is slightly arched or intermediately bent, as clearly shown by Fig. 3, to give it sufficient elevation when the trap is set and render it effective as a releasing means when depressed by the weight of the animal imposed thereon.

A lasso or tether 24 having a noose 25 at one extremity and a weight 26 at the opposite extremity is used with and forms a part of the trap, the said lasso or tether being of any suitable length and of such strength as to adapt it to resist breakage or separation from the weight under maximum tension and strain conditions.

In setting the trap the frame bar 5 with its supporting arm 6 is disposed on the ground surface and the throwing arm 13 caught under the hook or catch 16, to hold the arm 13 down in temporary fixed position, the free extremity of the bar 17 having been first raised so that when the arm 13 is down in set position the curved beveled end 23 of the bar 17 may be rested on the upper projecting edge of the bar 13 in rear of the hook extremity 14, as shown by Fig. 3. The pairs of noose supporting bars 20 are then arranged as shown by Figs. 1 and 2 and the noose 25 will then be loosely disposed in the seats 22 and over the upper edge of the bar 17, as shown by Fig. 2, with the adjacent portion of the lasso 24 bearing in the hook extremity 14 of the arm 13 and the weight 26 placed at any suitable or most effective distance from the trap. The trap as thus set may then be hidden or at least partially covered without interfering with the operation of the noose 25 and the arm 13, and when the animal steps on the rest 19 or adjacent portion of the bar 17, the latter will be depressed and force the arm 13 out of engagement or laterally away from the hook or catch 16 and immediately the spring 11 will act to throw the noose and lasso upwardly over the foot and leg of the animal, as shown by Fig. 1, and the resistance offered by the weight 26 will draw the noose tightly on the leg of the animal and impede his travel by reason of the attached weight and thereby facilitate capturing him. It is obvious that the animal having the weight attached to him will be practically tethered, and by varying the dimensions of the weight or increasing or decreasing its resistance to movement and also modifying the proportions and dimensions of the trap the latter may be readily adapted for catching animals of various sizes. In placing the trap it will be disposed in runways or in open fields or tracks traversed by the animal desired to be caught, and in view of the fact that the lasso and its noose become dissociated from the trap when the latter is sprung and the animal caught by the noose, no injury will result to the trap by pulling or tugging strains exerted thereon, and furthermore, it will be unnecessary to fasten the trap by anchoring or analogous devices. It is proposed to form all of the parts of the trap of metal of such strength and durability that breakage thereof will be resisted by pressure of the foot of the animal and the weight of the latter on any part thereof. The trap will not become released or sprung unless the releasing means or bar 17 is engaged and the noose will be spread over the said bar 17 to such an extent as to insure effective trapping operation of the said noose when any part of the bar is engaged.

What is claimed is:

1. In a trap, the combination of a frame, a spring-actuated throwing arm movably held by said frame, means carried by the said frame for locking the arm depressed in set position, a release means supported by said frame and loosely extending over a portion of the free extremity of the throwing arm and provided with a tread portion, the release means by its depression disengaging the arm from the locking means, a noose supporting means carried by said release means, and a lasso extending over the free extremity of the throwing arm and having a running noose adapted to be disposed on the noose supporting means and also having a resisting device attached therto, the lasso being unconnected with relation to any part of the trap.

2. In a trap, a spring-actuated throwing arm, locking means for holding the throwing arm in set position, a release means adapted to loosely engage the free extremity of the throwing arm and provided with noose supporting means, the depression of the release and noose supporting means disengaging the arm from the locking means, and a lasso normally independent of the throwing arm and having a resisting means attached thereto and applied loosely over the free extremity of the throwing arm and having a running noose which is loosely laid on the said noose supporting means, the lasso and its noose being entirely liberated from the trap when the latter is sprung and also free for separation from the throwing arm.

3. In a trap, the combination of a frame-bar having an annular supporting arm, a spring-actuated throwing arm fulcrumed to one end of the frame bar, a locking means carried by the frame bar to loosely engage the said arm, a release means consisting of a bar pivotally attached to the said supporting arm and movable over the free extremity of the throwing arm and carrying noose supporting means, the depression of the release and noose supporting means disengaging the arm from the locking means, and a lasso loosely laid over and unconnected to the free extremity of the throwing arm and having a resistance means attached thereto and a noose which is loosely laid on the noose supporting means.

4. In a trap, a spring-actuated throwing arm, means for holding the arm in set position, a release means for the throwing arm carrying noose supporting devices and embodying a bar disposed at right angles to and movable over the free extremity of said arm, and a lasso loosely applied over the free extremity of the throwing arm and having a running noose which is loosely laid on the noose supporting means and also provided with a resisting means, the depression of the release means carrying the noose supporting devices disengaging the said arm from the means for holding the latter in set position.

In testimony whereof I have hereunto set my hand in presence of two subscribing witnesses.

GREEN K. WOODS.

Witnesses:
  CHAS. R. WEBSTER,
  WILLIAM S. BONNIFIELD, Jr.

Copies of this patent may be obtained for five cents each, by addressing the "Commissioner of Patents, Washington, D. C."